Oct. 31, 1967  C. VALLS  3,349,580
DEVICE FOR THE CONTINUOUS TREATMENT OF TEXTILE MATERIALS
Filed June 30, 1965  13 Sheets-Sheet 5

FIG.13

Oct. 31, 1967 C. VALLS 3,349,580
DEVICE FOR THE CONTINUOUS TREATMENT OF TEXTILE MATERIALS
Filed June 30, 1965 13 Sheets-Sheet 6

Oct. 31, 1967  C. VALLS  3,349,580
DEVICE FOR THE CONTINUOUS TREATMENT OF TEXTILE MATERIALS
Filed June 30, 1965  13 Sheets-Sheet 7

Oct. 31, 1967 C. VALLS 3,349,580
DEVICE FOR THE CONTINUOUS TREATMENT OF TEXTILE MATERIALS
Filed June 30, 1965 13 Sheets-Sheet 13

United States Patent Office 3,349,580
Patented Oct. 31, 1967

3,349,580
DEVICE FOR THE CONTINUOUS TREATMENT
OF TEXTILE MATERIALS
Conrado Valls, Consejo de Ciento 401, 3°, 2a,
Barcelona, Spain
Filed June 30, 1965, Ser. No. 468,501
Claims priority, application Germany, July 1, 1964,
V 26,267
22 Claims. (Cl. 68—22)

ABSTRACT OF THE DISCLOSURE

A textile treatment device having a vessel containing a bath in which a textile material is guided on a plurality of adjacent supporting elements firstly on the upper surfaces thereof and then in continuation on the lower surfaces thereof so as to divide the vessel into two chambers, the bath being passed along a fluid circuit and through the textile material under the difference of pressure in the chambers.

---

This invention relates to devices for the continuous treatment of textile materials, especially woven fabrics, employing, for example, liquids for the scouring, bleaching, normal dyeing and high temperature dyeing of polyester fibers, and also including fixing acidulated soaping, washing and rinsing operations.

In one typical working application, for example the dyeing of polyester fibers at high temperature, two fundamental processes are generally employed.

The more frequently used of these two processes involves dyeing in a vessel under pressure, which presents the following disadvantages:

(a) the necessity for winding the textile material on a cloth beam support for its subsequent dyeing;
(b) the variation of results when tension is applied to the fabric upon being wound on the cloth beam, which implies that this operation is a delicate one;
(c) the lack of uniformity in the treatment, owing to the different velocities of the treatment liquid through the distinct layers, or from the exterior to the interior layers;
(d) the moire or watering effects of spotting produced when the direction of the dye bath is reversed;
(e) the difficulty in increasing the flow volume of the liquid by increasing the pressure, since such increased pressure holds the layers of fabric more tightly together, thus rendering the passing of the liquid more difficult; and
(f) the necessity for repeatedly reloading the cloth beams in the machine, thus reducing output and increasing production cost.

The other process used for the finishing of polyester fibers, as indicated above, is a continuous one known as the "Thermosol" process, which has the inconvenience of having to be worked in very large lots by color and wherein, moreover, the textile material has to be submitted to at least four distinct operations, viz; impregnation; pre-drying; thermofixing and soaping, for which reason the installation required for this process is very costly. The fabrics treated by this process have a poor feel which reduces their practical value, so that another treatment becomes necessary to improve the feel, which nevertheless only partially remedies the damage already caused.

In the non-continuous or reloading processes, the drying is irregular when brilliant colors have to be used; moreover, the use of expensive chemical products is necessary.

The device according to this invention for the treatment of textile materials, especially woven fabrics in a continuous form by means of a dye bath, is characterized by passing the textile material to be treated in a continuous layer through a vessel full of the treatment liquid or dye bath, in such a manner that the textile fabric acts as a partition separating said vessel into two portions, preferably horizontal at different interior pressures, such that the liquid is forced through the textile fabric due to the difference in these pressures.

The following advantages are obtained from the invention and in accordance with the objects thereof:

(1) the textile material does not have to be wound onto a beam support for dyeing purposes;
(2) the liquid or dye bath passes through all areas of the fabric at uniform speed;
(3) the working process is continuous so that high production is obtained;
(4) the liquid or dye bath passes through the fabric at high speed, which contributes toward higher production;
(5) the working process is carried out more rapidly than any other presently known process;
(6) excellent dyeing is obtained in only a single operation;
(7) the use of expensive chemicals which necessarily increase the cost of the application of the process is unnecessary; and
(8) the chambers in the vessel containing the dye bath may be very shallow or flat, thus reducing to a minimum the amount of liquid in circulation and making full use of the whole of the same.

The invention has two variations according to which the vessel that holds the dye bath is closed or open.

One device for the realization of the process of this invention is characterized by the provision of a vessel having guides for guiding the textile fabric, and joint sealing devices applied at the borders of the textile fabric to be treated which together with this latter separate said vessel into two chambers which are connected in series in a closed circuit in which the dye bath or treatment liquid is continuously circulated by means of pumps at different pressures.

The invention is seen in greater detail in the following description of various embodiments as illustrated in the drawing in which:

FIGURES 14 to 16 show devices adapted to treatment in chain form;

Figure 1:
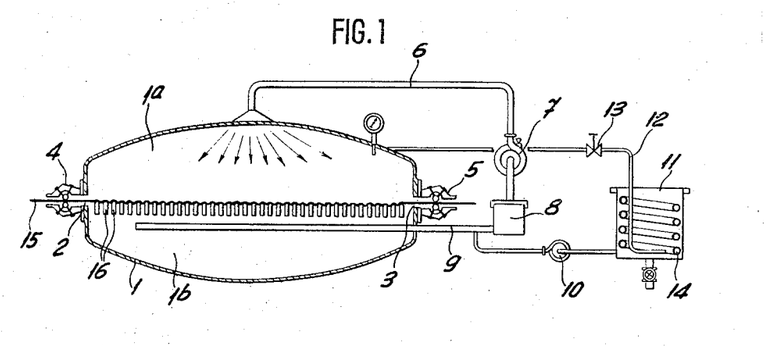
FIGURE 1 is a cross-sectional view of a device in accordance with a first embodiment of the invention, with supporting cross bars on which the fabric rests on one side only.

In FIG. 1 a vessel 1 in which textile material is treated is provided with openings 2 and 3 at its extremities for the entry and exit of the textile material. These openings 2 and 3 are provided with mechanical seals 4 and 5 in order to enable maintaining the interior of the vessel 1 completely full of treatment liquid or dye bath, under a pressure above atmospheric. The dye bath is introduced by means of a main pump 7 through a main feed pipe 6, while the pump pulls or aspirates the liquid from an intermediary vessel 8 which communicates through a suction pipe 9 with the lower part of the vessel 1.

The dye bath is also provided with a secondary circuit in which the circulation is maintained by means of an auxiliary pump 10, which aspirates a part of the dye bath from a vessel 11 provided with a heating coil 14 and delivers it to the suction pipe 9 in front of the intermediary vessel 8. The vessel 11 communicates with the vessel 1 through the pipe 12 and the valve 13.

The textile material 15 passes through the vessel 1 by sliding over a series of supporting cross bars 16 arranged in parallel and extending across the vessel thus forming a supporting surface for the textile material. The upper extremities of these cross bars are rounded off to avoid excessive friction. The textile material is guided hermetically, as will later be described in greater detail.

The textile material 15 divides the vessel 1 into two chambers, 1a and 1b, the upper half or chamber 1a being submitted to a pressure which is greater than atmospheric by the main pump 7, while the lower half or chamber 1b of the vessel 1 is subjected to a lower pressure, so that the dye bath passes by pressure from the upper chamber 1a to the lower chamber 1b.

This arrangement may be modified by substituting the cross bar supports 16 with cylinders that rotate on their end supports, thus reducing the energy necessary to pass the cloth through the machine.

Figure 2:
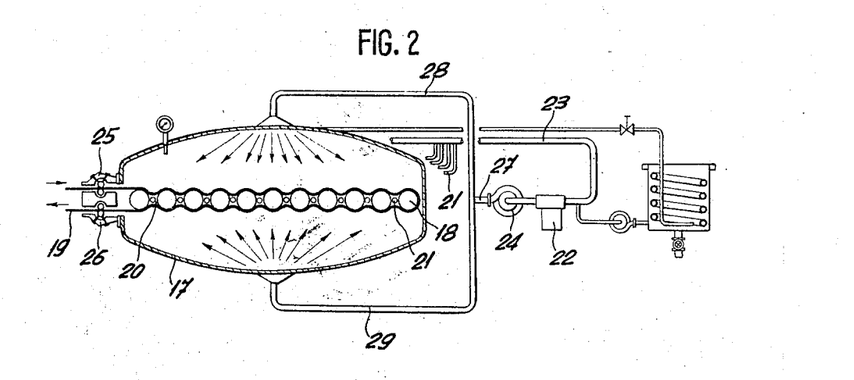
FIGURE 2 is a cross-sectional view of a device in accordance with a second embodiment of the invention, with supporting cylinders against which the fabric is applied on both sides.

FIG. 2 shows a second embodiment, in which the vessel 17 is provided with several transverse supporting rollers 18 to support the textile fabric 19, the rollers being of relatively large diameter. The textile material enters the vessel 17 through the same orifice as that through which it leaves, and is applied to the top and bottom surfaces of rollers 18. The textile fabric and the supporting rollers enclose spaces 20 in which are located tubes 21 through which the dye bath from the vessel 17 passes to a vessel 22 via piping 23 (see also FIG. 3), which vessel feeds a pressure pump 24.

In this embodiment the dye bath circulates from the exterior surface of the textile fabric 19 to the inside surface passing through the hollow spaces 20 from which it passes to the tubes 21 and then to the pump 24. The inlet and outlet side of the vessel 17 is provided with mechanical sealing devices 25 and 26.

The pump 24 causes the dye bath to pass through the pipe 27 which is bifurcated into branches 28 and 29 which open respectively into the upper and lower chambers of the vessel 17.

Figure 3:
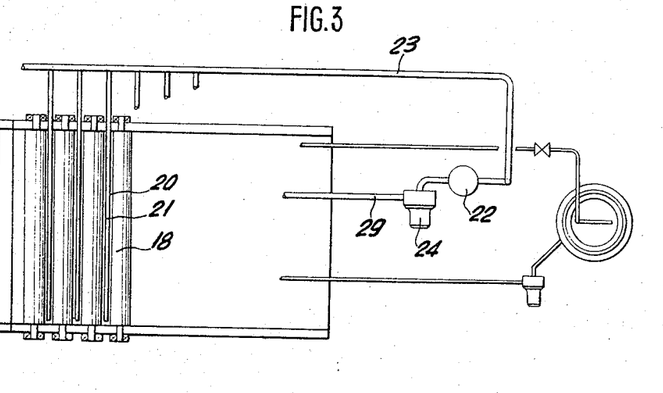
FIGURE 3 is a plan view of the example given in FIG. 2, some parts being omitted for clarity.
Figure 4:
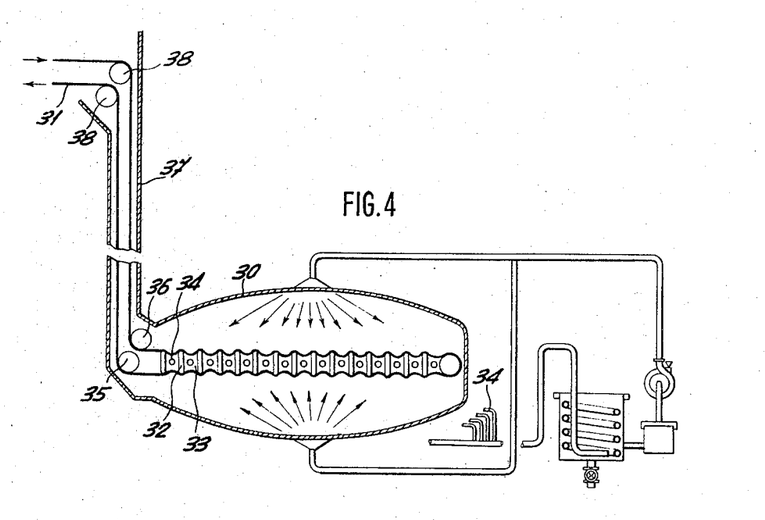
FIGURE 4 is a cross-sectional view of a device according to a third embodiment of the invention with supporting cross bars against which the fabric is held on both sides.

According to a further embodiment of the invention, wherein the textile fabric enters and leaves the vessel at the same end thereof, as first shown in FIGS. 2 and 3, the arrangement of FIG. 4 may also be employed.

In this embodiment the textile material 31 passes into a vessel 30 sliding over supporting cross bars 32 whose upper edges have been rounded off as also are the lower edges. Tubes 34 are arranged in hollow spaces 33 between the cross bar supports 32 for the removal of the dye bath. The textile material 31 enters and leaves at the same end of the chamber or vessel 30, being guided by guide rollers 35 and 36 into and from a vertical chamber 37 which is partially filled with dye bath. The dye bath in the vertical chamber 37 reaches sufficient height to form a hydraulic seal in order to maintain the pressure in the vessel 30 which is above atmospheric. At the upper extremity of the chamber 37 the material is guided over two rollers 38, the ingoing fabric proceeding from a cloth beam, while the outgoing fabric enters a device for receiving the treated fabric.

Figure 5:
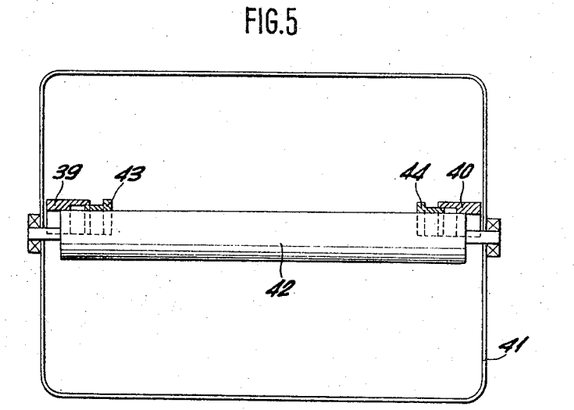
FIGURE 5 illustrates a supporting cylinder and fabric border sealing device which is adjustable to the width of the fabric.
Figure 6:
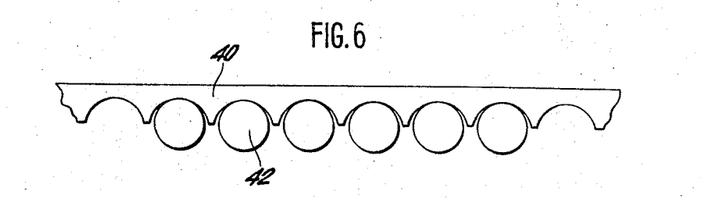
FIGURE 6 is an elevational view of a part of the border sealing device.

Whichever realization is adopted, a joint must be provided between the two chambers of the vessel, which are at different pressures, to accommodate different widths of textile fabric to undergo treatment and which forms a partition between the two chambers. Thus, for example, a sealing gasket or joint adjustable to the width of the textile fabric is provided at each border of this latter, as shown in FIGS. 5 and 6, wherein elements 39 and 40 bear against the walls of the vessel 41 and rest on supporting rollers 42 respectively.

Adjustable elements 43 and 44 which also rest on the supporting rollers, in conjunction with the lateral elements 39 and 40, limit the central zone on the rollers over which the textile moves during treatment.

FIGS. 7 to 12 show forms of supporting rollers that allow the evacuation of liquid that has already served for treatment, such evacuation taking place through the interior of said rollers.

Figures 7, 9:
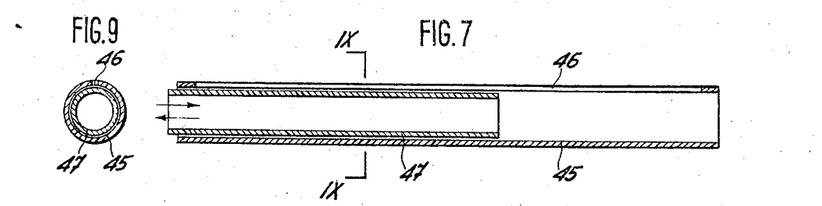
FIGURE 7 is a longitudinal sectional view through a supporting cylinder.
FIGURE 9 is a sectional view on line IX—IX in FIG. 7.
Figure 8:
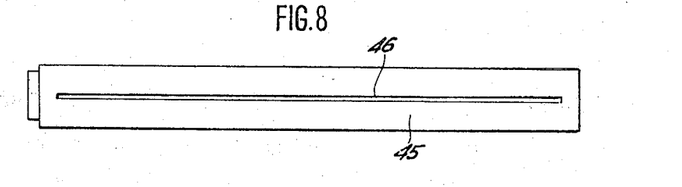
FIGURE 8 is a front view of the supporting cylinder of FIG. 7.

FIGS. 7 to 9 show a supporting cylinder 45 provided with a slot 46 for the passage of the dye bath, said slot being parallel to the axis of the cylinder. A tube 47 which may be moved telescopically within the cylinder 45 limits the passage of the dye bath to the working width covered by the textile material treated.

Figure 10:
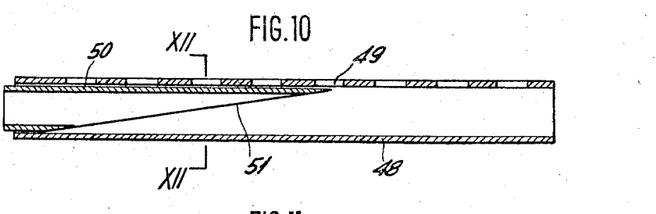
FIGURE 10 is a longitudinal sectional view along line X—X in FIG. 12 of another supporting cylinder.
Figure 11:
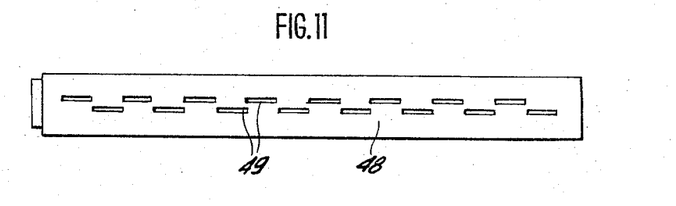
FIGURE 11 is a front view of the supporting cylinder of FIG. 10.
Figure 12:
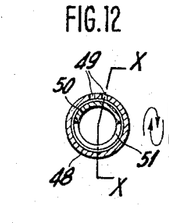
FIGURE 12 is a sectional view on line XII—XII in FIG. 10.

FIGS. 10 to 12 show a supporting cylinder 48 provided with small orifices 49 arranged in rows with offset spacing for the passage of the dye bath. A tube 50 is provided within the cylinder 48, whose helicoidal front end 51 selectively uncovers the surface of the supporting cylinder and the orifices therein when turned and so regulates the passage of the dye bath.

A device for reheating and replenishing the dye bath in the main circuit in a form distinct from that shown in FIG. 1 may be seen in FIG. 4, in which case the auxiliary pump 10 is unnecessary, along with its suction and output piping. The inlet and outlet of the textile fabric in this case may be situated also at opposite ends of the vessel as in FIG. 1, for which purpose a chamber 37 (FIG. 4) would be provided at each extremity of the vessel 30.

The process according to this invention may further be realized with cord or chain form material, devices for which are shown in FIGS. 13 to 16.

Figure 13:
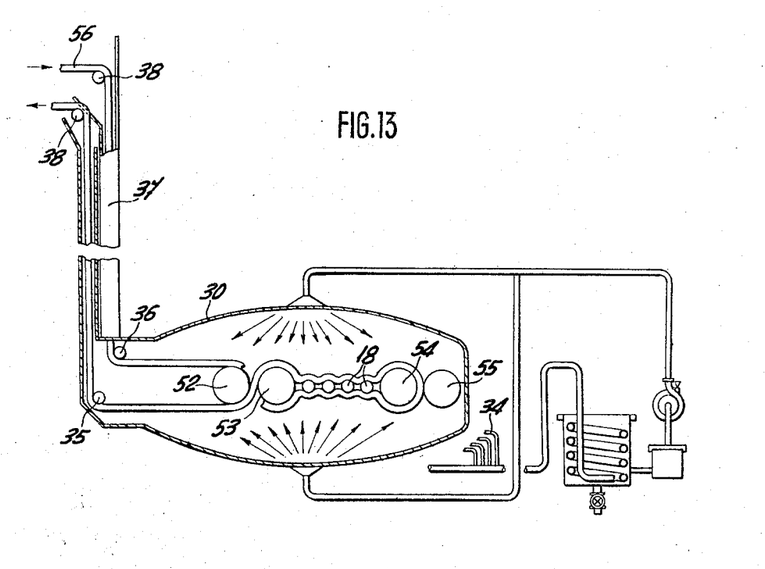
FIGURE 13 is a schematic sectional view of a construction using squeezing cylinders.

Insofar as its general construction is concerned, the device shown in FIG. 13 corresponds to that shown in FIG. 4, but the supporting cross bars 32 are not employed. Instead, supporting rollers 18 are used such as those in FIGS. 2 and 3. The guide rollers situated in front of and behind the supporting rollers 18 constitute two pairs of squeezing rollers 52 to 55 between which the cord or chain-like material 56 is made to pass. These expressing systems formed by pairs of squeezing rollers may be used also for the treatment of material in band form, in front of or behind a row of supporting rollers or cross bars.

The aforementioned expressing system may be omitted from in front of the supporting elements, whereby the expressing system situated behind the supporting elements will be in operation. Due to the application of the expressing systems, the action of the dye bath is accelerated and intensified.

Figure 14:
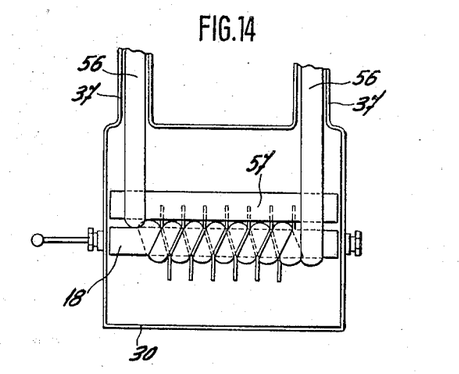
FIGURE 14 is a front view without squeezing cylinders.
Figure 15:
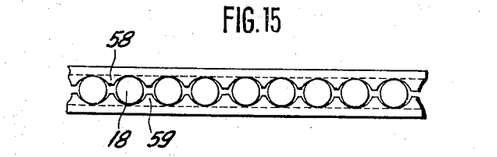
FIGURE 15 is a detail of separating partitions.
Figure 16:
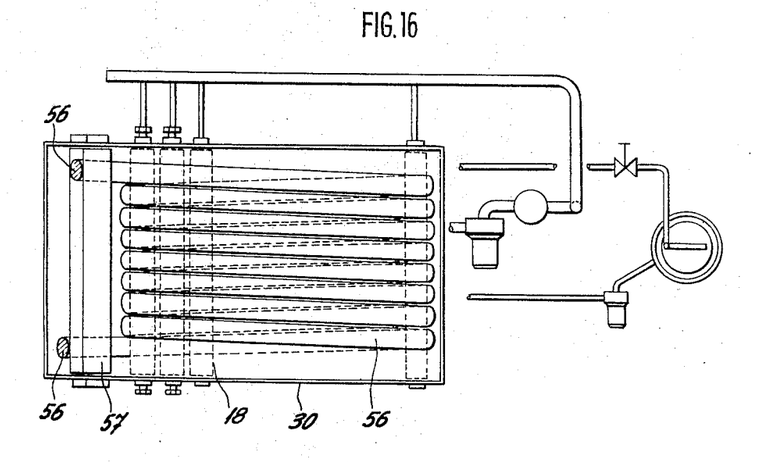
FIGURE 16 is a top view of a device without squeezing cylinders.

The two pairs of expressing rollers 52 to 55 are not shown in the system of FIGS. 14 to 16, wherein the cord-like material 56 enters via a guide cylinder 57 and rests on the supporting rollers 18, of which the first and the last serve as return rollers, as will be appreciated from FIGS. 14 and 16. The individual turns of the cord-like material 56 are situated so close together, one alongside the next, that together they form a layer of material of sufficiently closed structure to separate the vessel 30 into an upper and a lower chamber, so that different pressures may be maintained in these two chambers, which pressure difference causes the dye bath to pass through the material under treatment. The inlet and outlet of the cord-like material is effected through two separate vertical chambers 37 adjoining the upper portion of the vessel 30, in which chambers the dye bath forms hydraulic seals as described above.

It is advisable to separate the textile cord-like material by means of bridge elements 58 and 59 situated on the top and at the bottom of the rollers 18, which bridge elements adopt the form of tympan separators like combs whose longitudinal upper and lower skirtings present respectively a profile that is adapted to the rollers 18.

When the dye bath is introduced under pressure into the upper and lower chambers, as shown graphically in FIG. 13, the liquid is evacuated from the vessel by tubes not shown in FIGS. 13 to 16, in the manner previously described with reference to tubes 21 in the example according to FIG. 2, or with the tubes 34 in the example shown in FIG. 4, or with the hollow supporting rollers or cylinders of FIGS. 7 to 12.

Figure 17:
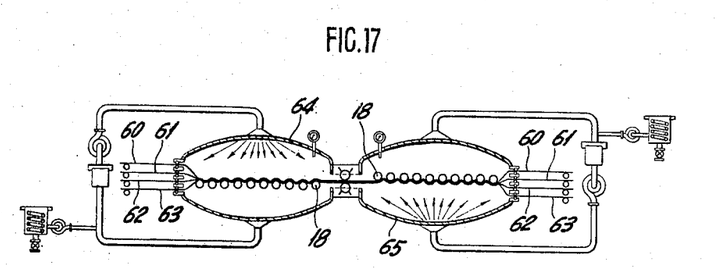
FIGURE 17 is a sectional view of an apparatus obtained by the combination of two devices producing a compound apparatus.

In FIG. 17 two devices of the type described above are arranged one behind the other so that the outlet from one device coincides with the inlet of the other device. A similar arrangement is also possible for a greater number of devices. By combining several devices in this manner, the treatment process may be repeated so that the treatments are successive and, in this manner, the material may be treated several times with the same dye bath, or successively with different dye baths.

According to FIG. 17, the dye bath is made to penetrate the fabric by applying pressure on one side of the same, the bath being withdrawn on the other side of the fabric, while mechanical seals are provided for the entry and exit of the textile fabric. The band of textile fabric that passes through these devices is here composed of 4 bands, 60 to 63, superimposed one upon another. The dye bath is made to enter the chamber 64 of the first device under pressure in the upper chamber, the band of fabric being supported by the rollers 18. The dye bath is made to enter the lower chamber 65 under pressure, so that here the fabric is pressed against the under sides of the supporting rollers 18. Upon leaving the chamber 65, the four bands 60 to 63 are separated one from the other.

The object of passing the dye bath in opposite directions in the successive vessels is to render the treatment uniform, since it might occur that the layer of fabric that first receives the dye bath will be more efficiently treated than the subsequent layers.

A combination of various devices may also be effected by adopting the forms corresponding to the other examples already given or to be described hereinafter, especially when the dye bath is admitted under pressure from above and from below the fabric, the evacuation taking place between the supporting elements, rollers or hollow cylinders; also the inlets and outlets may be in the form of vertical chambers in which the dye bath forms a hydraulic seal. Also, the supporting elements may be cross bars and vessels can be used in which the upper portions are open instead of closed.

Figure 18:
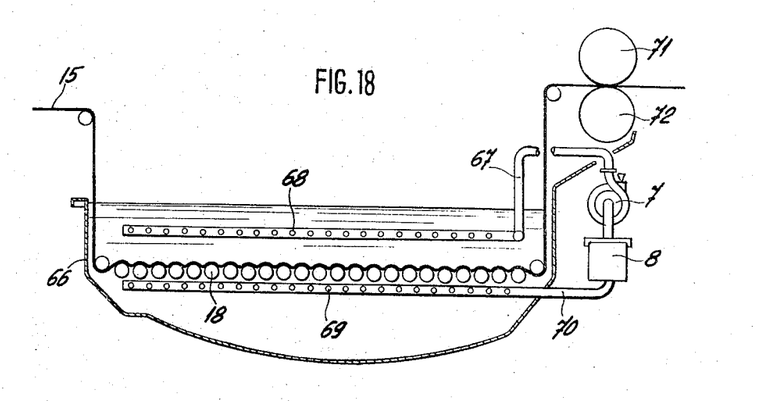
FIGURE 18 is a sectional view of a device having an open vessel.

A difference of pressures may also be maintained between the upper and lower portions of the vessel wherein the fabric serves as partition and the vessel 66 is open, as shown in FIG. 18, wherein appear rollers 18. The dye bath is supplied to the upper chamber through the piping 67 from which distribution pipes 68 emerge, these being situated within the vessel. Suction tubes 69 which discharge into the suction pipe 70 are situated under the supporting rollers 18 which hold the fabric on their upper surfaces. Additionally, instead of withdrawing from below and feeding from above, suction may be arranged from above and feeding from below, in which case a band of the textile fabric will have to be applied to the lower sides of the supporting rollers 18, which rollers may also be in the form of supporting cross bars. In the example shown in FIG. 18, two expressing rollers 71 and 72 are provided outside the vessel 66, forming a wringing system for the outgoing material. As in the other examples shown, the fabric will pass over return guide rollers as required.

Figure 19:
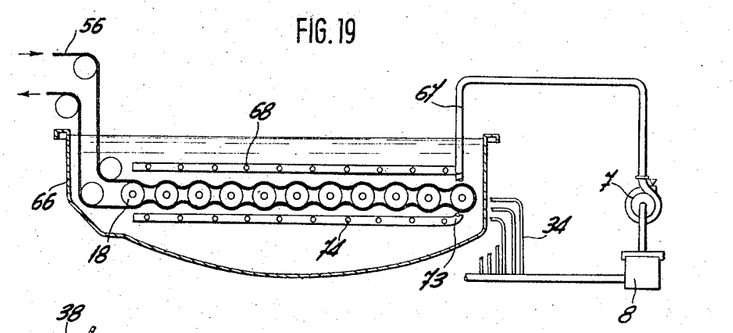
FIGURE 19 is a sectional view of a device with an open vessel prepared for the entry and exit of the material in chain form on the same side, or in endless form as in FIGS. 13 to 16 above.

The device shown in FIG. 19 functions similarly to that of FIG. 18 with an open vessel 66, but in this case the textile material enters and leaves at the same side, which in the illustration is on the left while the material 56, in this case being in cord or chain-like form, is applied to both the tops and bottoms of the rollers 18. The liquid forming the dye bath is supplied through the piping 67, not only by the distribution tubes 68, but also through a branch pipe 73 and the distribution tubes 74 from below. The liquid is evacuated through the hollow cylinders 18 and by evacuation tubes 34 arranged between the rollers in the manner already described.

Figure 20:
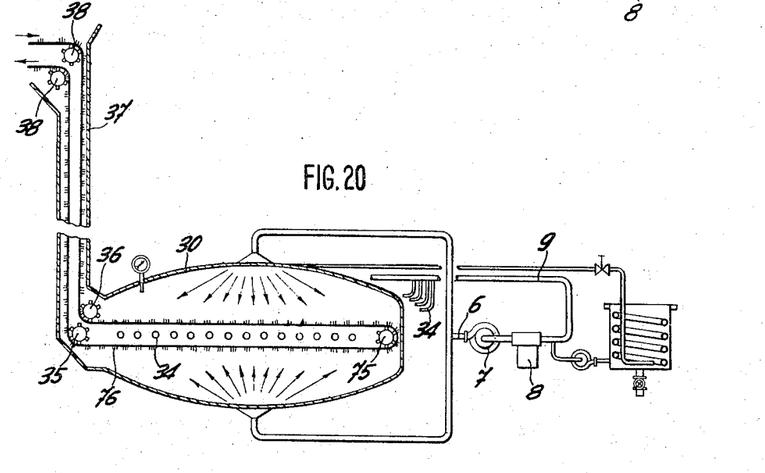
FIGURE 20 is a device similar to that in FIG. 4, but having spiked chains instead of cross bar supports.

The device shown in FIG. 20 is constituted similarly to that shown in FIG. 4. The textile material is, however, drawn transversely between spiked chains 76, in which state it passes through the device for treatment. The spiked chains, whose application renders unnecessary the use of supporting elements such as supporting rollers or cross bars, may be replaced by pincer chains. The guide and re-directional rollers 35, 36, 38 and 75 perform the function of guide or re-directional rollers or wheels for the spiked chains. The evacuation tubes 34 are arranged on a central plane between the main directional rollers 35 and 75. The employment of chains, with their supporting, guiding and transporting devices for the textile material, demonstrates how this system may be applied to the present invention, while the drawing of the fabric in the weft direction is especially indicated in the treatment of knitted fabric, by weft or by warp.

Figure 21:
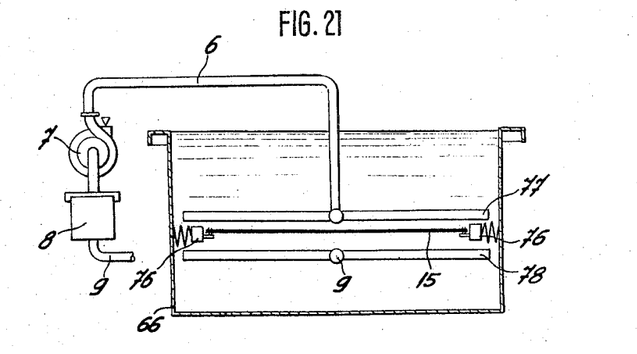
FIGURE 21 is a sectional view of a device with sprinkler tubes arranged on each side of a band of fabric in an open vessel.
Figure 22:
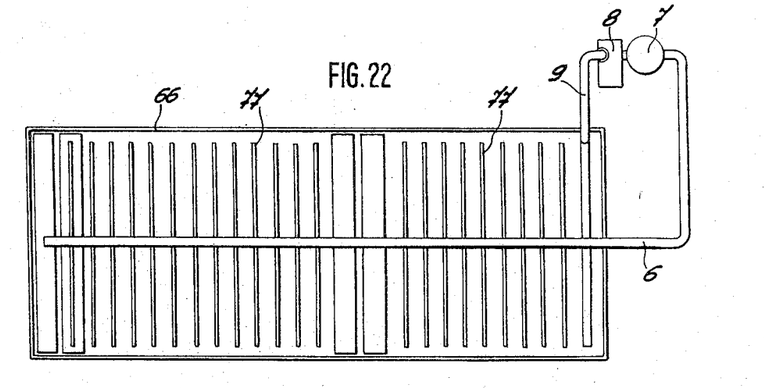
FIGURE 22 is a plan view of a piping arrangement.

While in the example shown in FIG. 20, as also in those of FIGS. 1, 4 and 13, the dye bath enters the upper and lower chambers of the vessels approximately towards the center in the directions shown by the arrows in the example shown in FIG. 21, in which the fabric is similarly extended between spiked chains 76, the liquid enters into an open vessel 66 by means of sprinkler tubes 77 which are supplied from the pump 7 through the piping 6. Tubes 77 are arranged below the level of the dye bath and close to the fabric 15, against which the dye bath is directed in strong jets. The liquid is removed through suction tubes 78 situated in front of the sprinkler tubes and at the lower portion of the vessel, and passes through the suction tube 9. From FIG. 22 it may be appreciated how the sprinkler tubes 77, fed by the circulation pump 7, may be distributed throughout the whole of the section of the vessel 66.

In all embodiments with suction and sprinkler tubes, the inlet and outlet orifices may be graduated, and the distribution of the active apertures may be made in similar form and with means as described above in connection with the orifices of the supporting rollers in FIGS. 7 to 12.

Figure 23:
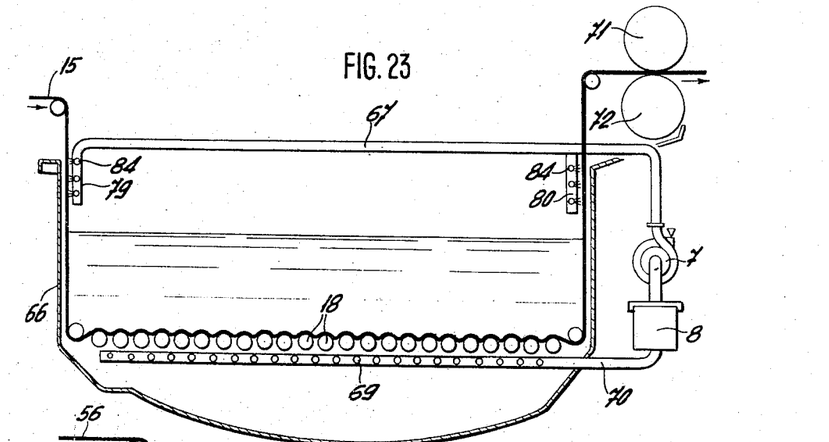
FIGURE 23 is a section similar to that of FIG. 18, wherein the dye bath or treatment liquid is fed through nozzles situated above the level of the liquid in the open vessel, while the fabric enters and leaves this latter at opposite extremities of the same.
Figure 24:
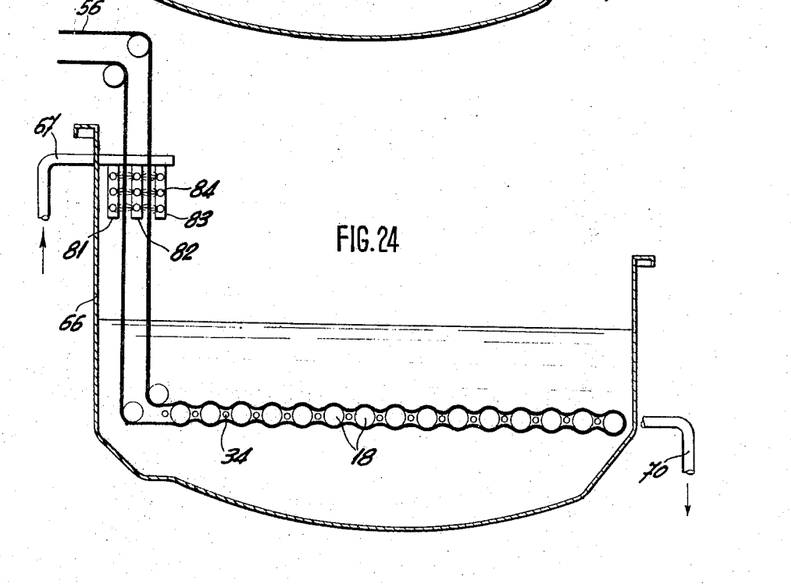
FIGURE 24 is a section similar to that of FIG. 19 with the dye bath fed through nozzles situated above the level of the liquid in the open vessel, while the fabric enters and leaves the vessel at the same extremity.

The examples shown in FIGS. 23 and 24 are arranged similarly to those of FIGS. 18 and 19, but while in these latter the dye bath is discharged from sprinkler tubes situated below the level of the liquid in the vessel, in the former case the liquid is delivered exclusively from outside the level of the dye bath.

In the example shown in FIG. 23, the feed pipe 67 has two branches 79 and 80 which carry transversely arranged sprinkler tubes 84 from which the dye bath emerges onto the fabric 15 which enters at one extremity of the open vessel 66 and leaves at the opposite side.

Contrary to this arrangement, in FIG. 24, the fabric 56 is made to enter and leave at the same side of the vessel 66, in this case at the left of same. In this embodiment the inlet tube 67 is provided with branches 81, 82 and 83, transversely to which the sprinkler tubes 84 from which the dye bath is projected onto the incoming and outgoing bands 56 of the fabric under treatment.

The liquid is extracted in FIG. 23 by means of transverse tubes 69 connected to the suction pipe 70 and in FIG. 24, by means of transverse tubes 34 communicating with the suction pipe 70, and which transverse tubes are situated between the supporting rollers 18.

The supporting rollers 18 in FIGS. 23 and 24 may be substituted by supporting cross bars such as elements 16 in FIG. 1, while the holding and transport of the fabric may be effected also by means of tensor chains as described for the examples of FIGS. 20 and 21.

Figure 25:
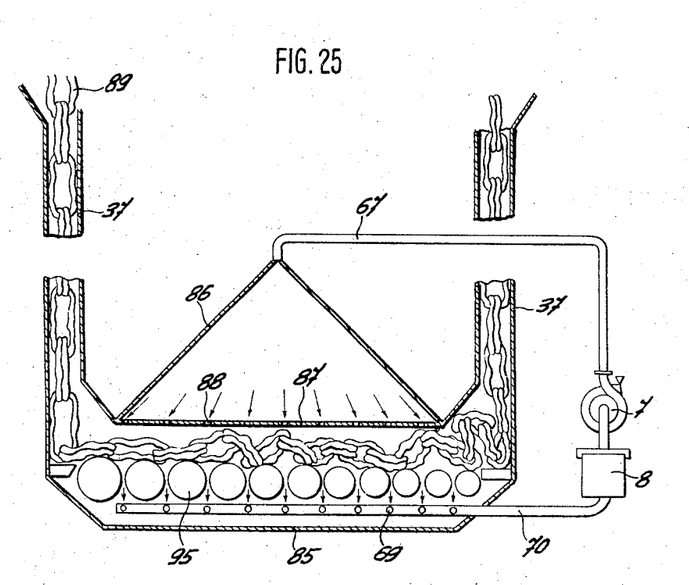
FIGURE 25 is a sectional view of a device prepared for the entry and exit of textile material at opposite extremities of the closed vessel, in the form of a continuous linked chain.

The device shown in FIG. 25 is intended for the treatment of textile material in the form of hanks 89 linked together in chain form. In addition to hanks of yarn, knitted textile articles in hank form and knitted goods in chain form may be treated. This embodiment uses a closed vessel 85 containing supporting rollers 95 of decreasing diameter in the direction of movement of the goods, but in other respects similar to the supporting rollers 18, 45 or 48 in construction. The diminution in diameter of the rollers corresponds to a diminution in peripheral velocity, so that the material transported and linked in chain form accumulates during the passage of same through the device. In this way, each discrete area of the goods, including those points that were originally in contact in the links forming the chain, are presented uniformly to the dye bath, and the whole of the mass is regularly treated.

A conical distributor 86 is provided in the vessel 85 and is coupled to a supply tube 67. The bottom 87 of the distributor 86 which forms the upper wall of the vessel 85, is provided with apertures 88 through which the liquid emerges under pressure. The linked material 89 under treatment enters and leaves the vessel 85 by means of the vertical chambers 37 superimposed on said vessel and which are tapered in section from the bottom upwards, the smaller section being at the top, and which chambers form hydraulic seals as previously described.

Figure 26:
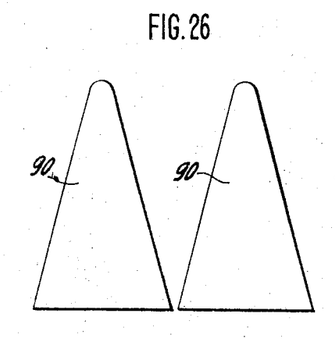
FIGURE 26 is a front view of a triangular shaped supporting cross bar.
Figure 27:
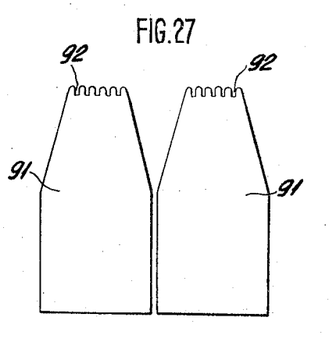
FIGURE 27 is a front view of cross supporting bars with trapeziform upper section.
Figure 28:
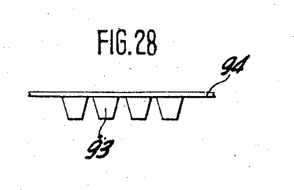
FIGURE 28 is a front view of a series of closing or sealing pieces.
Figure 29:
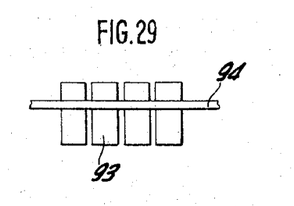
FIGURE 29 is an upper view of the device of FIG. 28.
Figure 30:
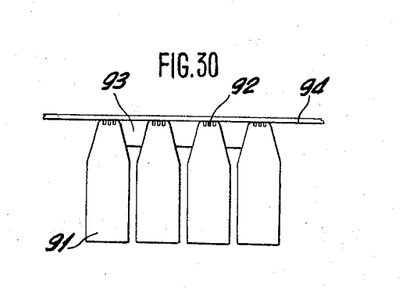
FIGURE 30 is a front view showing the arrangement of the closing or sealing elements in the supporting cross bars.
Figure 31:
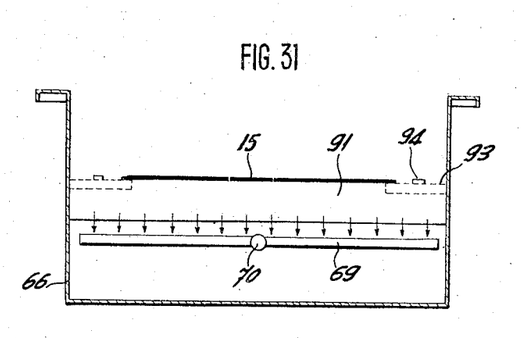
FIGURE 31 is a section of a device equipped with the elements shown in FIGS. 27 to 30.
Figure 32:
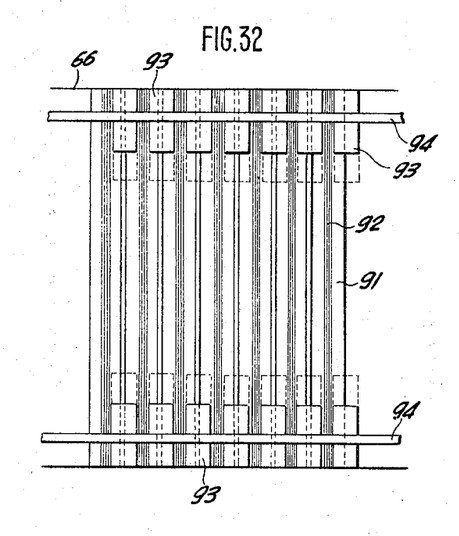
FIGURE 32 is a partial upper view corresponding to FIG. 31.

The supporting cross bars 16 of rectangular section as mentioned relative to the examples of FIG. 1, may be replaced by cross bars 90 of different section (FIG. 26), one of the vertices of the triangle being conveniently rounded off. In the example shown in FIGS. 27 to 32, supporting cross bars 91 are employed whose upper portions are trapezoidal and are provided with slots 92, thus presenting a linear contact between the supports and the fabric and facilitating the passage of the dye bath. The supporting cross bars of triangular or trapezoidal section will leave ample space between their top sides, which are not covered by the fabric, for the passage of the dye bath, for which reason closing pieces 93 of trapezoidal section are interposed between the upper parts of the cross bars. These pieces 93 have solid walls and are conveniently constructed from elastic material, for example synthetic material. They are fixed in groups with longitudinal profiles 94 so that they may be removed and replaced in groups together with said profiles. According to the width of the textile fabric, profiles provided with closing pieces 93 of greater or less length may be employed (see the prolongations of the closing pieces 93 shown in broken lines in FIG. 32).

What is claimed is:

1. A device for treating a textile material in a liquid bath, said device comprising a vessel for containing said bath, guiding means for engaging and guiding the textile material through said vessel and which, together with said fabric material, divides said vessel into two chambers, said guiding means including a plurality of adjacent supporting elements having upper and lower surfaces in respective horizontal planes and means for guiding the textile material firstly over one of the surfaces and then in continuation over the other of the surfaces and pressure means including a fluid circuit coupled to said chambers and through which the liquid bath circulates, said pressure means causing a pressure differential to exist between said chambers whereby the bath passes through the textile material.

2. A device according to claim 1 comprising conduits in at least one of said chambers and provided with apertures for the production of impulse jets distributed within the vessel over the surface of the textile material.

3. A device according to claim 1 comprising conduits in at least one of said chambers, independent from the supporting elements and adjacent thereto, said conduits being provided with apertures for the production of suction within the vessel over the surface of the textile material.

4. A device according to claim 1 comprising sprinkler nozzles connected to said fluid circuit and arranged outside the bath contained in the vessel.

5. A device according to claim 1 wherein the supporting elements are straight supporting cross bars of rectangular section including rounded upper edges.

6. A device according to claim 1 wherein the supporting elements are of triangular form including rounded upper borders.

7. A device according to claim 1 wherein the supporting elements are supporting cross bars including upper portions of trapezoidal shape.

8. A device according to claim 7 wherein longitudinal slots are provided in the upper surfaces of the supporting cross bars on which the textile material rests.

9. A device according to claim 1 wherein the supporting elements are rotatable rollers.

10. A device according to claim 9 comprising expressing rollers adjacent the supporting roller.

11. A device according to claim 9 for cordlike materials, wherein the first and the last of the series of rollers act as guide rollers for the cordlike material, and comprising, for the separation of the cordlike textile materials, bridge pieces superimposed on the rollers.

12. A device according to claim 9 wherein the supporting rollers are hollow and provided with orifices for the evacuation of the liquid through the interior of said hollow rollers.

13. A device according to claim 12 comprising a regulating element in the form of a tube slidable within at least one supporting roller to graduate the section of orifices in a progressive manner.

14. A device according to claim 13 wherein the regulating element is in the form of a telescopic tube that can be moved telescopically within the associated hollow supporting roller.

15. A device according to claim 13 wherein the regulating element is in the form of a rotatable tube within the associated hollow supporting roller, said element having a helicoidal extremity.

16. A device according to claim 12 wherein the latter said means includes a row of driving rollers of diameters decreasing in the transporting direction of the material.

17. A device according to claim 1 comprising chains constituting guiding elements and conveyors for the textile material in said vessel.

18. A device according to claim 1 comprising inlet and outlet means on the same side of the vessel.

19. A device according to claim 1, wherein said means for guiding the textile material operates to advance the material firstly over the upper surfaces and then over the lower surfaces of the supporting elements.

20. A device according to claim 1 comprising collector tubes in the vessel for the evacuation of the liquid and situated between the supporting elements.

21. A device according to claim 1 comprising means whereby the material being conveyed through the bath is conveyed at a decreasing velocity in order to accumulate gradually within the vessel.

22. Apparatus comprising a plurality of devices as claimed in claim 1 connected in series arrangement.

References Cited

UNITED STATES PATENTS

| | | | |
|---|---|---|---|
| 313,306 | 3/1885 | Farmer et al. | 68—184 |
| 318,888 | 5/1885 | Farmer et al. | 68—184 |
| 1,737,149 | 11/1929 | Cohoe. | |
| 2,396,908 | 3/1946 | Wamble | 8—151 |
| 2,445,504 | 7/1948 | Williams | 8—151 |
| 2,590,407 | 3/1952 | Haas | 68—184 |
| 2,724,955 | 11/1955 | Spooner | 68—205 X |
| 2,900,991 | 8/1959 | Arnold | 68—205 X |
| 2,994,215 | 8/1961 | Higginbottom | 68—5 |
| 3,152,464 | 10/1964 | Faraguna | 68—184 |
| 3,267,704 | 8/1966 | Muller | 68—62 |

FOREIGN PATENTS

| | | |
|---|---|---|
| 216,459 | 7/1961 | Austria. |
| 572,159 | 11/1958 | Belgium. |

IRVING BUNEVICH, *Primary Examiner.*